(12) United States Patent
Ma et al.

(10) Patent No.: US 10,868,363 B2
(45) Date of Patent: Dec. 15, 2020

(54) ANTENNA SYSTEM AND SIGNAL TRANSMISSION METHOD

(71) Applicant: HUAWEI TECHNOLOGIES CO., LTD., Shenzhen (CN)

(72) Inventors: Ni Ma, Shanghai (CN); Yueheng Li, Nanjing (CN); Wei Gu, Shanghai (CN); Tuanjie Xue, Nanjing (CN); Jianping Zhao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 15 days.

(21) Appl. No.: 15/996,525

(22) Filed: Jun. 4, 2018

(65) Prior Publication Data
US 2018/0277947 A1    Sep. 27, 2018

Related U.S. Application Data

(63) Continuation of application No. PCT/CN2015/098428, filed on Dec. 23, 2015.

(51) Int. Cl.
*H01Q 1/50* (2006.01)
*H01Q 1/52* (2006.01)
(Continued)

(52) U.S. Cl.
CPC .......... *H01Q 1/523* (2013.01); *G01S 7/28* (2013.01); *H01Q 21/061* (2013.01); *H04B 1/40* (2013.01); *H04B 7/0413* (2013.01)

(58) Field of Classification Search
CPC ...... H01Q 1/523; H01Q 21/061; H01Q 5/335; H01Q 5/50; H01Q 1/46; G01S 7/28; H01B 1/38; H01B 1/40; H04B 7/0413
(Continued)

(56) References Cited

U.S. PATENT DOCUMENTS

| 2009/0184879 A1 | 7/2009 | Derneryd et al. |
| 2010/0201598 A1 | 8/2010 | Lau et al. |

(Continued)

FOREIGN PATENT DOCUMENTS

| CN | 101427419 A | 5/2009 |
| CN | 101452073 A | 6/2009 |

(Continued)

OTHER PUBLICATIONS

Jon W. Wallace et al. Mutual Coupling in MIMO Wireless Systems: A Rigorous Network Theory Analysis, IEEE Transactions on Wireless Communications, vol. 3, No. 4, Jul. 2004. pp. 1317-1325.
(Continued)

*Primary Examiner* — Binh B Tran
(74) *Attorney, Agent, or Firm* — Kilpatrick Townsend & Stockton LLP (57) ABSTRACT

An antenna system and a signal transmission method are provided. The antenna system includes: an antenna array and a matching network, where an S parameter matrix of the matching network matches an S parameter matrix of the antenna array and the matching network is configured to perform pre-distortion on a to-be-transmitted signal or de-distortion on a received signal, and the antenna array is configured to transmit the pre-distorted to-be-transmitted signal. According to the antenna system and the signal transmission method provided in this application, pre-distortion may be performed on a signal that needs to be transmitted by the antenna array or de-distortion may be performed on a signal received by the antenna array, so as to configure energy that is coupled from each antenna array element to an adjacent antenna array element, thereby reducing a coupling effect between antenna array elements.

10 Claims, 3 Drawing Sheets

(51) Int. Cl.
*G01S 7/28* (2006.01)
*H04B 1/40* (2015.01)
*H01Q 21/06* (2006.01)
*H01Q 21/00* (2006.01)
*H04B 7/0413* (2017.01)

(58) Field of Classification Search
USPC ........ 343/850, 852, 858, 860, 861, 862, 865
See application file for complete search history.

(56) References Cited

U.S. PATENT DOCUMENTS

| | | | |
|---|---|---|---|
| 2011/0222444 A1* | 9/2011 | Khlat | H03F 3/68 370/277 |
| 2011/0250926 A1* | 10/2011 | Wietfeldt | H01Q 9/14 455/525 |
| 2012/0009983 A1 | 1/2012 | Mow et al. | |
| 2013/0052964 A1 | 2/2013 | Husted | |
| 2015/0063486 A1 | 3/2015 | Broyde et al. | |

FOREIGN PATENT DOCUMENTS

| | | |
|---|---|---|
| CN | 102856646 A | 1/2013 |
| CN | 103765783 A | 4/2014 |
| CN | 104280732 A | 1/2015 |
| CN | 104425890 A | 3/2015 |
| CN | 104993881 A | 10/2015 |
| JP | 2010503261 A | 1/2010 |
| JP | 2014525712 A | 9/2014 |
| KR | 20120004338 A | 1/2012 |
| KR | 20150133276 A | 11/2015 |
| WO | 2007124766 A1 | 11/2007 |
| WO | 2015069478 A1 | 5/2015 |
| WO | 2015172807 A1 | 11/2015 |

OTHER PUBLICATIONS

Jon W. Wallace et al. Impact of Antenna Coupling on Diversity Performance: Complete Network Theory Analysis. IEEE Communications Society, 2004. pp. 947-951.

Zhu Jinpeng et al. Matching network design in strong coupling array and its influence on antenna performance, Chinese Journal of Radio Scienc, vol. 27, No. 6, Dec. 2012. total 5 pages, With English Abstract.

Masahiro Mori, et al., "A consideration on Simple Decoupling Circuit without Three-dimensional Structure for MIMO Antennas", Proceedings of the 2014 IEICE Communications Society Conference, Sep. 9, 2014, p. 137.

XP011036361 W. Preston Geren et al.,"A Practical Technique, for Designing Multiport Coupling Networks",IEEE Transactions on Microwave Theory and Techniques, vol. 44, No. 3, Mar. 1996,total 8 pages.

* cited by examiner

ANTENNA SYSTEM AND SIGNAL TRANSMISSION METHOD

CROSS-REFERENCE TO RELATED APPLICATIONS

This application is a continuation of International Application No. PCT/CN2015/098428, filed on Dec. 23, 2015, the disclosure of which is hereby incorporated by reference in its entirety.

TECHNICAL FIELD

The present invention relates to the field of wireless mobile communications, and in particular, to an antenna system and a signal transmission method.

BACKGROUND

Compared with a single-antenna transmission scheme, a multiple-input multiple-output (MIMO) antenna system can greatly improve transmission quality and transmission efficiency of a radio communications link. Therefore, the MIMO antenna system has become one of key technologies for commercially using wireless mobile communications both in and outside China. In order to meet a requirement for a more reliable wireless mobile communications service with a higher transmission rate, a massive MIMO antenna system having characteristics such as a large capacity, high reliability and green low power consumption emerges, and quickly attracts much attention of academia and vendors of network and communications devices.

Considering installation and deployment requirements such as a weight, wind drag, and the like, an antenna is usually limited in actual design in terms of a size. Because a massive MIMO antenna usually includes hundreds of or even more antenna array elements, a spacing between massive MIMO antenna array elements needs to be reduced when there is a size limit.

A decrease in a spacing between antenna array elements increases an array element coupling effect between the antenna array elements. The array element coupling effect means that electromagnetic field interaction between adjacent array elements of an antenna array changes an induced current or an induced voltage of each array element, thereby distorting an originally uncoupled receive or transmit signal on the antenna array element. In addition, an increase in the coupling effect between the antenna array elements has relatively great impact on a spatial correlation of antenna signals, an antenna gain, and even a system capacity.

SUMMARY

Embodiments of the present invention provide an antenna system and a signal transmission method, so as to reduce a coupling effect between antenna array elements.

According to a first aspect, an embodiment of the present invention provides an antenna system. The antenna system includes: a transmit end antenna array and a transmit end matching network, where an S parameter matrix of the transmit end matching network matches an S parameter matrix of the transmit end antenna array and is configured to perform pre-distortion on a to-be-transmitted signal, and the transmit end antenna array is configured to transmit the to-be-transmitted signal that has been pre-distorted by the transmit end matching network. The matching network matches the antenna array. Therefore, according to the antenna system provided in this aspect, by using the matching network, pre-distortion may be performed on a signal that needs to be transmitted by the antenna array or de-distortion may be performed on a signal received by the antenna array, so as to configure energy that is coupled from each antenna array element to an adjacent antenna array element, thereby reducing a coupling effect between antenna array elements.

With reference to the first aspect, in a first possible implementation of the first aspect, the transmit end matching network is a multiport conjugate matching network or a self-impedance matching network of the transmit end antenna array. When the transmit end matching network is the multiport conjugate matching network or the self-impedance matching network of the transmit end antenna array, the transmit end matching network may greatly reduce a coupling effect between antenna array elements, thereby greatly lowering a requirement for a spacing between the antenna array elements and greatly reducing a size of the antenna system.

With reference to the first aspect or the first possible implementation of the first aspect, in a second possible implementation of the first aspect, the S parameter matrix of the transmit end matching network is $$\overline{\overline{S}}_M^{Tx} = \begin{pmatrix} \overline{\overline{S}}_{11}^{Tx} & \overline{\overline{S}}_{12}^{Tx} \\ \overline{\overline{S}}_{21}^{Tx} & \overline{\overline{S}}_{22}^{Tx} \end{pmatrix},$$

where $\overline{\overline{S}}_{11}^{Tx}$ is a self-reflection coefficient matrix of an input port of the transmit end matching network, $\overline{\overline{S}}_{22}^{Tx}$ is a self-reflection coefficient matrix of an output port of the transmit end matching network, $\overline{\overline{S}}_{12}^{Tx}$ is a backward transmission matrix that is transmitted backward from the output port to the input port of the transmit end matching network, and $\overline{\overline{S}}_{21}^{Tx}$ is a forward transmission matrix that is transmitted forward from the input port to the output port of the transmit end matching network. The transmit end matching network is determined by using the S parameter matrix, so that a characteristic of the transmit end matching network can be easily determined.

With reference to the second possible implementation of the first aspect, in a third possible implementation of the first aspect, when the transmit end matching network has a multiport conjugate matching structure of the transmit end antenna array, the self-reflection coefficient matrix of the output port of the transmit end matching network is $\overline{\overline{S}}_{22}^{Tx} = \overline{\overline{S}}_{TT}^{H}$, the self-reflection coefficient matrix of the input port of the transmit end matching network is $\overline{\overline{S}}_{11}^{Tx} = \overline{\overline{S}}_{22}^{Tx} = \overline{\overline{S}}_{TT}^{H}$, the forward transmission matrix of the transmit end matching network is $\overline{\overline{S}}_{21}^{Tx} = -\overline{\overline{U}}_{22}\overline{\overline{\Theta}}^{H}(\overline{\overline{I}}-\overline{\overline{\Lambda}}_{22})^{1/2}\overline{\overline{V}}_{11}^{H}$, and the backward transmission matrix of the transmit end matching network is $\overline{\overline{S}}_{12}^{Tx} = \overline{\overline{U}}_{11}\overline{\overline{\Theta}}(\overline{\overline{I}}-\overline{\overline{\Lambda}}_{22})^{1/2}\overline{\overline{V}}_{22}^{H}$, where $\overline{\overline{S}}_{TT}$ is the S parameter matrix of the transmit end antenna array, $\overline{\overline{S}}_{22}^{Tx} = \overline{\overline{U}}_{22}\overline{\overline{\Lambda}}_{22}^{1/2}\overline{\overline{V}}_{22}^{H}$ is singular value decomposition of $\overline{\overline{S}}_{22}^{Tx}$, any unitary matrix $\overline{\overline{U}}_{11} = \overline{\overline{U}}_{22}$, $\overline{\overline{V}}_{11} = \overline{\overline{V}}_{22}$, or $\overline{\overline{\Theta}}$ is any unit diagonal complex matrix.

With reference to the second possible implementation of the first aspect, in a fourth possible implementation of the first aspect, when the transmit end matching network has a self-impedance matching structure of the transmit end antenna array, the self-reflection coefficient matrix of the output port of the transmit end matching network is $\overline{\overline{S}}_{22}^{Tx} = \text{diag}(\overline{\overline{S}}_{TT}^{H})$ the self-reflection coefficient matrix of the input port of the transmit end matching network is $\overline{\overline{S}}_{11}^{Tx} =$ $\overline{S}_{22}^{Tx}=\text{diag}(\overline{S}_{TT}^{H})$, the forward transmission matrix of the transmit end matching network is $\overline{S}_{21}^{Tx}=-\overline{U}_{220}\overline{\Theta}^{H}(\overline{I}-\overline{\Lambda}_{22})^{1/2}\nabla_{11}^{H}$, and the backward transmission matrix of the transmit end matching network is $\overline{S}_{12}^{Tx}=\overline{U}_{11}\overline{\Theta}(\overline{I}-\overline{\Lambda}_{22})^{1/2}\nabla_{22}^{H}$, where $\overline{S}_{TT}$ is the S parameter matrix of the transmit end antenna array, diag(·) is an operation of taking diagonal elements of a matrix to form a diagonal matrix, $\overline{S}_{22}^{Tx}=\overline{U}_{22}\overline{\Lambda}_{22}^{1/2}\nabla_{22}^{H}$ is singular value decomposition of $\overline{S}_{22}^{Tx}$, any unitary matrix $\overline{U}_{11}=\overline{U}_{22}$, $\nabla_{11}=\nabla_{22}$, or $\overline{\Theta}$ is any unit diagonal complex matrix.

With reference to any one of the first aspect, or the first to the fourth possible implementations of the first aspect, in a fifth possible implementation of the first aspect, an array element spacing of the transmit end antenna array is less than a half of a first wavelength, where the array element spacing is an inter-row spacing or an inter-column spacing between antenna array elements included in the transmit end antenna array, and the first wavelength is a wavelength of a signal carrier transmitted by the antenna system. The array element spacing is less than the first wavelength, thereby greatly reducing a size of the antenna array, and reducing a size of the antenna system.

According to a second aspect, an embodiment of the present invention further provides another antenna system, including: a receive end antenna array and a receive end matching network, where the receive end antenna array is configured to convert an incident electromagnetic signal radiated by a spatial physical channel into a voltage signal or a current signal; and an S parameter matrix of the receive end matching network matches an S parameter matrix of the receive end antenna array and is configured to perform de-distortion on the voltage signal or the current signal.

With reference to the second aspect, in a first possible implementation of the second aspect, the receive end matching network is a multiport conjugate matching network or a self-impedance matching network of the receive end antenna array.

With reference to the second aspect or the first possible implementation of the second aspect, in a second possible implementation of the second aspect, the S parameter matrix of the receive end matching network is $$\overline{S}_{M}^{Rx} = \begin{pmatrix} \overline{S}_{11}^{Rx} & \overline{S}_{12}^{Rx} \\ \overline{S}_{21}^{Rx} & \overline{S}_{22}^{Rx} \end{pmatrix},$$

where $\overline{S}_{11}^{Rx}$ is a self-reflection coefficient matrix of an input port of the receive end matching network, $\overline{S}_{22}^{Rx}$ is a self-reflection coefficient matrix of an output port of the receive end matching network, $\overline{S}_{12}^{Rx}$ is a backward transmission matrix that is transmitted backward from the output port to the input port of the receive end matching network, and $\overline{S}_{21}^{Rx}$ is a forward transmission matrix that is transmitted forward from the input port to the output port of the receive end matching network.

With reference to the second possible implementation of the second aspect, in a third possible implementation of the second aspect, when the receive end matching network has a multiport conjugate matching structure of the receive end antenna array, the self-reflection coefficient matrix of the input port of the receive end matching network is $\overline{S}_{11}^{Rx}=\overline{S}_{RR}^{H}$, the self-reflection coefficient matrix of the output port of the receive end matching network is $\overline{S}_{22}^{Rx}=\overline{S}_{11}^{Rx}=\overline{S}_{RR}^{H}$, the forward transmission matrix of the receive end matching network is $\overline{S}_{22}^{Rx}=-\overline{U}_{22}\overline{\Theta}^{H}(\overline{I}-\overline{\Lambda}_{22})^{1/2}\nabla_{11}^{H}$, and the backward transmission matrix of the receive end matching network is $\overline{S}_{12}^{Rx}=\overline{U}_{11}\overline{\Theta}(\overline{I}-\overline{\Lambda}_{22})^{1/2}\nabla_{22}^{H}$, where $\overline{S}_{RR}$ is the S parameter matrix of the receive end antenna array, $\overline{S}_{22}^{Rx}=\overline{U}_{22}\overline{\Lambda}_{22}^{1/2}\nabla_{22}^{H}$ is singular value decomposition of $\overline{S}_{22}^{Rx}$, any unitary matrix $\overline{U}_{11}=\overline{U}_{22}$, $\nabla_{11}=\nabla_{22}$, or $\overline{\Theta}$ is any unit diagonal complex matrix.

With reference to the second possible implementation of the second aspect, in a fourth possible implementation of the second aspect, when the receive end matching network has a self-impedance matching structure of the receive end antenna array, the self-reflection coefficient matrix of the input port of the receive end matching network is $\overline{S}_{11}^{Rx}=\text{diag}(\overline{S}_{RR}^{H})$ the self-reflection coefficient matrix of the output port of the receive end matching network is $\overline{S}_{22}^{Rx}=\overline{S}_{11}^{Rx}=\text{diag}\{\overline{S}_{RR}^{H}\}$, the forward transmission matrix of the receive end matching network is $\overline{S}_{21}^{Rx}=-\overline{U}_{22}\overline{\Theta}^{H}(\overline{I}-\overline{\Lambda}_{22})^{1/2}\nabla_{11}^{H}$, and the backward transmission matrix of the receive end matching network is $\overline{S}_{12}^{Rx}=\overline{U}_{11}\overline{\Theta}(\overline{I}-\overline{\Lambda}_{22})^{1/2}\nabla_{22}^{H}$, where $\overline{S}_{RR}$ is the S parameter matrix of the receive end antenna array, diag(·) is an operation of taking diagonal elements of a matrix to form a diagonal matrix, $\overline{S}_{22}^{Rx}=\overline{U}_{22}\overline{\Lambda}_{22}^{1/2}\nabla_{22}^{H}$ is singular value decomposition of $\overline{S}_{22}^{Rx}$, any unitary matrix $\overline{U}_{11}=\overline{U}_{22}$, $\nabla_{11}=\nabla_{22}$, or $\overline{\Theta}$ is any unit diagonal complex matrix.

With reference to any one of the second aspect, or the first to the fourth possible implementations of the second aspect, in a fifth possible implementation of the second aspect, an array element spacing of the receive end antenna array is less than a half of a second wavelength, where the array element spacing is an inter-row spacing or an inter-column spacing between antenna array elements included in the receive end antenna array, and the second wavelength is a wavelength of a signal carrier received by the antenna system.

According to a third aspect, an embodiment of the present invention further provides a signal transmission method. The method includes: generating a to-be-transmitted signal; performing pre-distortion on the to-be-transmitted signal according to an S parameter matrix of a transmit end matching network, where the S parameter matrix matches an S parameter matrix of a transmit end antenna array; and transmitting, by using the transmit end matching network, the to-be-transmitted signal that has been pre-distorted.

According to a fourth aspect, an embodiment of the present invention further provides another signal transmission method. The method includes: converting an incident electromagnetic signal radiated by a spatial physical channel into a voltage signal or a current signal by using a receive end antenna array; performing de-distortion on the voltage signal or the current signal according to an S parameter matrix of a receive end matching network, where the S parameter matrix of the receive end matching network matches an S parameter matrix of the receive end antenna array; and transmitting the voltage signal or the current signal that has been de-distorted to a load.

BRIEF DESCRIPTION OF DRAWINGS

To describe the technical solutions in the embodiments of the present invention more clearly, the following briefly describes the accompanying drawings required for describing the embodiments. Apparently, a person of ordinary skill in the art may still derive other drawings from these accompanying drawings without creative efforts.

DESCRIPTION OF EMBODIMENTS

Figure 1:
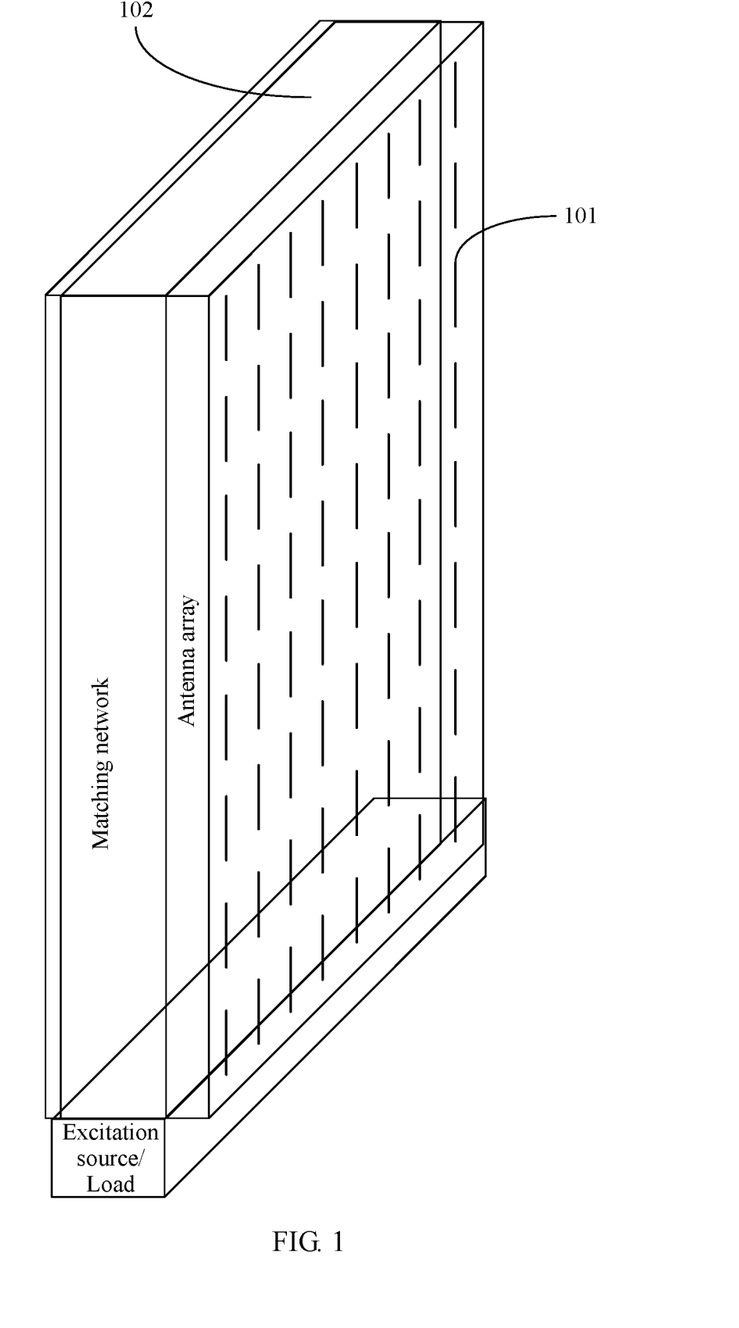
FIG. 1 is a schematic structural diagram of an embodiment of an antenna system according to the present invention.

Referring to FIG. 1, FIG. 1 is a schematic structural diagram of an antenna system according to the present invention. As shown in FIG. 1, the antenna system in this embodiment of the present invention may include multiple parts such as an antenna array 101 and a matching network 102 that matches the antenna array 101. The antenna array 101 includes a transmit antenna and a receive antenna that are used by a base station and a terminal. The antenna array 101 may be a massive MIMO antenna array, and the matching network 102 may be a circuit network.

When the antenna system is a transmit antenna system, the antenna array 101 is a transmit end antenna array, and the matching network 102 is configured to perform pre-distortion on a signal that needs to be transmitted by the antenna array 101. When the antenna system is a receive antenna system, the antenna array is a receive end antenna array, and the matching network 102 is configured to perform de-distortion on a signal received by the antenna array 101.

The matching network 102 may configure, by means of pre-distortion or de-distortion, energy that is coupled from each antenna array element to an adjacent antenna array element, so as to suppress signal distortion generated when the antenna array transmits a signal, or suppress signal distortion of a signal received by the antenna array, thereby reducing a coupling effect between antenna array elements. Matching between the matching network 102 and the antenna array 101 means that a scattering parameter (S parameter) matrix of the matching network 102 matches an S parameter matrix of the antenna array 101. Matching between the S parameter matrix of the matching network 102 and the S parameter matrix of the antenna array 101 means that the S parameter matrix of the matching network 102 is set based on the S parameter matrix of the antenna array 101, so that the matching network 102 cancels or partially cancels signal distortion generated when the antenna array 101 transmits a signal, or cancels or partially cancels signal distortion of a signal received by the antenna array 101. Matching between the matching network 102 and the antenna array 101 include multiport conjugate matching, self-impedance matching, and the like.

The S parameter matrix of the matching network 102 may be represented as $$\bar{\bar{S}}_M = \begin{pmatrix} \bar{\bar{S}}_{11} & \bar{\bar{S}}_{12} \\ \bar{\bar{S}}_{21} & \bar{\bar{S}}_{22} \end{pmatrix},$$

where $\bar{\bar{S}}_{11}$ is a self-reflection coefficient matrix of an input port of the matching network 102, $\bar{\bar{S}}_{22}$ is a self-reflection coefficient matrix of an output port of the matching network 102, $\bar{\bar{S}}_{12}$ is a backward transmission matrix that is transmitted backward from the output port of the matching network 102 to the input port of the matching network 102, and $\bar{\bar{S}}_{21}$ is a forward transmission matrix that is transmitted forward from the input port of the matching network 102 to the output port of the matching network 102.

Figure 2:
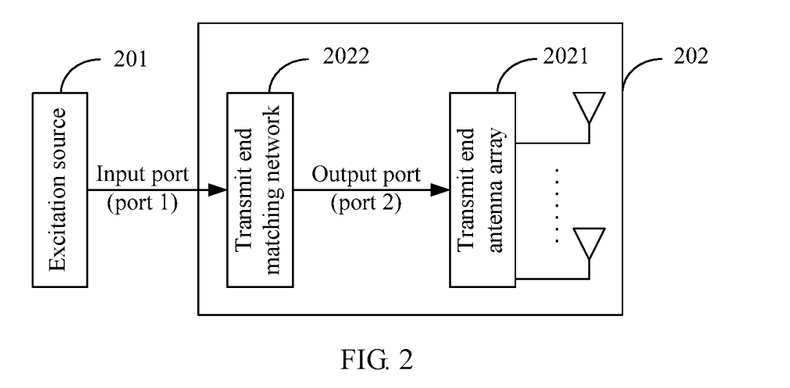
FIG. 2 is a schematic architectural diagram of an embodiment of a transmit end according to the present invention.

When the matching network is in the transmit antenna system and matches the transmit end antenna array, the input port is a port for connecting the matching network and a transmit end excitation source, that is, a port 1 shown in FIG. 2, and the output port is a port for connecting the matching network and the antenna array, that is, a port 2 shown in FIG. 2.

Figure 3:
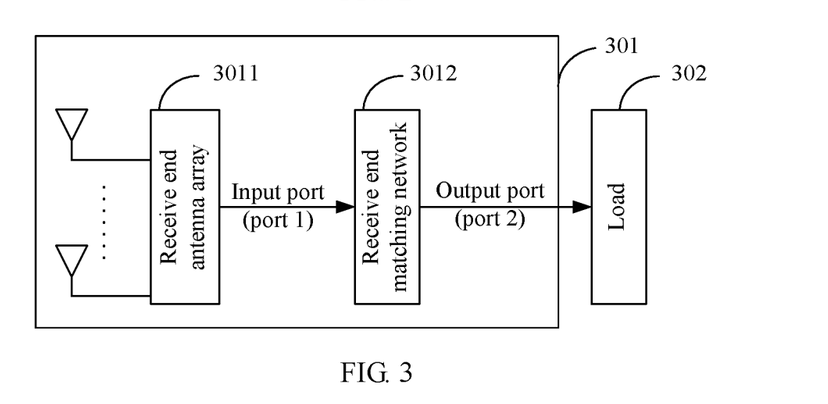
FIG. 3 is a schematic architectural diagram of an embodiment of a receive end according to the present invention.

When the matching network is in the receive antenna system and matches the receive end antenna array, the input port is a port for connecting the matching network and the receive end antenna array, that is, a port 1 shown in FIG. 3, and the output port is a port for connecting the matching network and a load, that is, a port 2 shown in FIG. 3.

When the matching network 102 is a multiport conjugate matching network of the antenna array 101, the self-reflection coefficient matrix of the output port of the matching network 102 is $\bar{\bar{S}}_{22}=\bar{\bar{S}}_{Ant}^H$, the self-reflection coefficient matrix of the input port of the matching network 102 is $\bar{\bar{S}}_{11}=\bar{\bar{S}}_{22}=\bar{\bar{S}}_{Ant}^H$, the forward transmission matrix of the matching network 102 is $\bar{\bar{S}}_{21}=-\bar{\bar{U}}_{22}\bar{\bar{\Theta}}^H(\bar{\bar{I}}-\bar{\bar{\Lambda}}_{22})^{1/2}\bar{\bar{V}}_{11}^H$, and the backward transmission matrix of the matching network 102 is $\bar{\bar{S}}_{12}=\bar{\bar{U}}_{11}\bar{\bar{\Theta}}(\bar{\bar{I}}-\bar{\bar{\Lambda}}_{22})^{1/2}\bar{\bar{V}}_{22}^H$, where $\bar{\bar{S}}_{Ant}$ is an S parameter matrix of the transmit end antenna array or the receive end antenna array, $\bar{\bar{S}}_{22}=\bar{\bar{U}}_{22}\bar{\bar{\Lambda}}_{22}^{1/2}\bar{\bar{V}}_{22}^H$ is singular value decomposition of $\bar{\bar{S}}_{22}$, any unitary matrix $\bar{\bar{U}}_{11}=\bar{\bar{U}}_{22}$, $\bar{\bar{V}}_{11}=\bar{\bar{V}}_{22}$, or $\bar{\bar{\Theta}}$ is any unit diagonal complex matrix.

When the matching network 102 is a self-impedance matching network of the antenna array 101, the self-reflection coefficient matrix of the output port of the matching network 102 is $\bar{\bar{S}}_{22}=\text{diag}(\bar{\bar{S}}_{Ant}^H)$ the self-reflection coefficient matrix of the input port of the matching network 102 is $\bar{\bar{S}}_{11}=\bar{\bar{S}}_{22}=\text{diag}(\bar{\bar{S}}_{Ant}^H)$ the forward transmission matrix of the matching network 102 is $\bar{\bar{S}}_{21}=-\bar{\bar{U}}_{22}\bar{\bar{\Theta}}^H(\bar{\bar{I}}-\bar{\bar{\Lambda}}_{22})^{1/2}\bar{\bar{V}}_{11}^H$, and the backward transmission matrix of the matching network 102 is $\bar{\bar{S}}_{12}=\bar{\bar{U}}_{11}\bar{\bar{\Theta}}(\bar{\bar{I}}-\bar{\bar{\Lambda}}_{22})^{1/2}\bar{\bar{V}}_{22}^H$, where $\bar{\bar{S}}_{Ant}$ is an S parameter matrix of the transmit end antenna array or the receive end antenna array, $\bar{\bar{S}}_{22}=\bar{\bar{U}}_{22}\bar{\bar{\Lambda}}_{22}^{1/2}\bar{\bar{V}}_{22}^H$ is singular value decomposition of $\bar{\bar{S}}_{22}$, any unitary matrix $\bar{\bar{U}}_{11}=\bar{\bar{U}}_{22}$, $\bar{\bar{V}}_{11}=\bar{\bar{V}}_{22}$, or $\bar{\bar{\Theta}}$ is any unit diagonal complex matrix.

The following further describes the present invention with reference to other accompanying drawings.

Referring to FIG. 2, FIG. 2 is a schematic architectural diagram of a transmit end of the present invention.

As shown in FIG. 2, the transmit end may include an excitation source 201 and a transmit antenna system 202, and the transmit antenna system 202 may include a transmit end antenna array 2021 and a transmit end matching network 2022. A port for connecting the transmit end matching network 2022 and the excitation source 201 is an input port of the transmit end matching network 2022, that is, a port 1 shown in FIG. 2. A port for connecting the transmit end matching network 2022 and the transmit end antenna array 2021 is an output port of the transmit end matching network 2022, that is, a port 2 shown in FIG. 2.

The excitation source 201 is configured to provide a to-be-transmitted signal. The transmit end matching network 2022 is configured to perform pre-distortion on the to-be-transmitted signal according to an S parameter matrix of the transmit end matching network 2022, so as to configure energy that is coupled from each antenna array element to an adjacent antenna array element, thereby canceling or partially canceling signal distortion generated when the transmit end antenna array 2021 transmits a signal, and suppressing a coupling effect between antenna array elements. The transmit end antenna array 2021 is configured to transmit the to-be-transmitted signal that has been pre-distorted by the transmit end matching network 2022.

The transmit end antenna array 2021 may be a massive MIMO antenna array of a base station or a mobile terminal antenna array provided with a plurality of transmit antennas. The transmit end antenna array 2021 may include a plurality of antenna array elements, and the antenna array elements may use cross-polarization array element deployment, or may use co-polarization array element deployment.

In some embodiments, an array element spacing of the transmit end antenna array is less than a half of a first wavelength. The first wavelength is a wavelength of a signal carrier transmitted by the antenna system, and the array element spacing is an inter-row spacing or an inter-column spacing between antenna array elements included in the transmit end antenna array.

For example, when the inter-column spacing between the antenna array elements is represented as $d_H$, the inter-row spacing between the antenna array elements is represented as $d_V$, and the wavelength of the signal carrier transmitted by the antenna system is represented as $\lambda_1$, at least one of $d_H$ or $d_V$ may be less than a half of $\lambda_1$.

When an S parameter matrix is used for describing the transmit end, an S parameter matrix of the excitation source 201 may be represented as $\overline{S}_S$, an S parameter matrix of the transmit end matching network 2022 may be represented as $\overline{S}_M^{Tx}$, and an S parameter matrix of the transmit end antenna array 2021 may be represented as $\overline{S}_{TT}$.

$\overline{S}_M^{Tx}$ may match $\overline{S}_{TT}$, so that the transmit end matching network 2022 can perform pre-distortion on a to-be-transmitted signal generated by the excitation source 201, and feed a signal generated after the pre-distortion to the transmit end antenna array 2021. In this way, energy that is coupled from each antenna array element to an adjacent antenna array element can be configured, so as to reduce a coupling effect between antenna array elements.

Because the transmit end matching network 2022 can control signal input and output, the transmit end matching network 2022 may be represented by an S parameter matrix $$\overline{S}_M^{Tx} = \begin{pmatrix} \overline{S}_{11}^{Tx} & \overline{S}_{12}^{Tx} \\ \overline{S}_{21}^{Tx} & \overline{S}_{22}^{Tx} \end{pmatrix},$$

where $\overline{S}_{11}^{Tx}$ is a self-reflection coefficient matrix of an input port of the transmit end matching network 2022, $\overline{S}_{22}^{Tx}$ is a self-reflection coefficient matrix of an output port of the transmit end matching network 2022, $\overline{S}_{12}^{Tx}$ is a backward transmission matrix that is transmitted backward from the output port to the input port of the transmit end matching network 2022, and $\overline{S}_{21}^{Tx}$ is a forward transmission matrix that is transmitted forward from the input port to the output port of the transmit end matching network 2022.

A specific manner of matching $\overline{S}_M^{Tx}$ and $\overline{S}_{TT}$ varies with different requirements for signal transmission performance and different requirements for complexity of the transmit end matching network 2022. Generally, the transmit end matching network 2022 may be a multiport conjugate matching network or a self-impedance matching network of the transmit end antenna array 2021.

According to different specific manners of matching $\overline{S}_M^{Tx}$ and $\overline{S}_{TT}$, submatrixes such as $\overline{S}_{11}^{Tx}$, $\overline{S}_{22}^{Tx}$, $\overline{S}_{12}^{Tx}$, and $\overline{S}_{21}^{Tx}$ are also different from each other.

When the transmit end matching network 2022 is the multiport conjugate matching network of the transmit end antenna array 2021, the S parameter matrix $\overline{S}_{TT}$ of the transmit end antenna array 2021 may be obtained by means of measurement or numerical calculation. Because the transmit end matching network 2022 is the multiport conjugate matching network of the transmit end antenna array 2021, $\overline{S}_{22}^{Tx} = \overline{S}_{TT}^H$ may be determined, and further, $\overline{S}_{11}^{Tx} = \overline{S}_{22}^{Tx} = \overline{S}_{TT}^H$, $\overline{S}_{21}^{Tx} = -\overline{U}_{22}\overline{\Theta}^H(I-\overline{\Lambda}_{22})^{1/2}\overline{V}_{11}^H$, and $\overline{S}_{12}^{Tx} = \overline{U}_{11}\overline{\Theta}(I-\overline{\Lambda}_{22})^{1/2}\overline{V}_{22}^H$ may be separately determined according to a lossless network design criterion $(\overline{S}_M^{Tx})^H \overline{S}_M^{Tx} = I$.

It may be learned that, when the transmit end matching network 2022 is the multiport conjugate matching network of the transmit end antenna array 2021, the self-reflection coefficient matrix of the output port of the transmit end matching network 2022 is $\overline{S}_{22}^{Tx} = \overline{S}_{TT}^H$, the self-reflection coefficient matrix of the input port of the transmit end matching network 2022 is $\overline{S}_{11}^{Tx} = \overline{S}_{22}^{Tx} = \overline{S}_{TT}^H$, the forward transmission matrix of the transmit end matching network 2022 is $\overline{S}_{21}^{Tx} = -\overline{U}_{22}\overline{\Theta}^H(I-\overline{\Lambda}_{22})^{1/2}\overline{V}_{11}^H$, and the backward transmission matrix of the transmit end matching network 2022 is $\overline{S}_{12}^{Tx} = \overline{U}_{11}\overline{\Theta}(I-\overline{\Lambda}_{22})^{1/2}\overline{V}_{22}^H$, where $\overline{S}_{TT}$ is the S parameter matrix of the transmit end antenna array 2021, $\overline{S}_{22}^{Tx} = \overline{U}_{22}\overline{\Lambda}_{22}^{1/2}\overline{V}_{22}^H$ is singular value decomposition of $\overline{S}_{22}^{Tx}$, any unitary matrix $\overline{U}_{11} = \overline{U}_{22}$, $\overline{V}_{11} = \overline{V}_{22}$, or $\overline{\Theta}$ is any unit diagonal complex matrix.

When the transmit end matching network 2022 is the self-impedance matching network of the transmit end antenna array 2021, the S parameter matrix $\overline{S}_{TT}$ of the transmit end antenna array 2021 may also be obtained by means of measurement or numerical calculation. Because the transmit end matching network 2022 is the self-impedance matching network of the transmit end antenna array 2021, $\overline{S}_{22}^{Tx} = \text{diag}\{\overline{S}_{TT}^H\}$ may be determined, and further, $\overline{S}_{11}^{Tx} = \overline{S}_{22}^{Tx} = \overline{S}_{TT}^H$, $\overline{S}_{21}^{Tx} = -\overline{U}_{22}\overline{\Theta}^H(I-\overline{\Lambda}_{22})^{1/2}\overline{V}_{11}^H$, and $\overline{S}_{12}^{Tx} = \overline{U}_{11}\overline{\Theta}(I-\overline{\Lambda}_{22})^{1/2}\overline{V}_{22}^H$ may be separately determined according to symmetry of the self-impedance matching network and a lossless network design criterion $(\overline{S}_M^{Tx})^H \overline{S}_M^{Tx} = I$.

It may be learned that, when the transmit end matching network 2022 is the self-impedance matching network of the transmit end antenna array 2021, the self-reflection coefficient matrix of the output port of the transmit end matching network 2022 is $\overline{S}_{22}^{Tx} = \text{diag}\{\overline{S}_{TT}^H\}$ the self-reflection coefficient matrix of the input port of the transmit end matching network 2022 is $\overline{S}_{11}^{Tx} = \overline{S}_{22}^{Tx} = \text{diag}\{\overline{S}_{TT}^H\}$, the forward transmission matrix of the transmit end matching network 2022 is $\overline{S}_{21}^{Tx} = -\overline{U}_{22}\overline{\Theta}^H(I-\overline{\Lambda}_{22})^{1/2}\overline{V}_{11}^H$, and the backward transmission matrix of the transmit end matching network 2022 is $\overline{S}_{12}^{Tx} = \overline{U}_{11}\overline{\Theta}(I-\overline{\Lambda}_{22})^{1/2}\overline{V}_{22}^H$, where $\overline{S}_{TT}$ is the S parameter matrix of the transmit end antenna array 2021, $\overline{S}_{22}^{Tx} = \overline{U}_{22}\overline{\Lambda}_{22}^{1/2}\overline{V}_{22}^H$ is singular value decomposition of $\overline{S}_{22}^{Tx}$, any unitary matrix $\overline{U}_{11} = \overline{U}_{22}$, $\overline{V}_{11} = \overline{V}_{22}$, or $\overline{\Theta}$ is any unit diagonal complex matrix.

After $\overline{S}_{11}^{Tx}$, $\overline{S}_{22}^{Tx}$, $\overline{S}_{12}^{Tx}$ and $\overline{S}_{21}^{Tx}$ are determined, a circuit structure conforming to a parameter value of each port may be designed according to a specific circuit design criterion, so as to obtain a circuit network that is used as the transmit end matching network 2022. A specific circuit structure design method of the transmit end matching network 2022 and a specific circuit structure of the transmit end matching network 2022 are not described herein.

It may be learned from experiments and simulations that, when an antenna array element spacing of a transmit antenna is quite small (for example, the antenna array element spacing is less than $0.5\lambda$, where $\lambda$ is a wavelength of a signal carrier transmitted by the transmit end), radiant power performance can be improved when a transmit end matching network is accessed between an excitation source and a transmit end antenna array. For example, a multiport conjugate matching network can keep highest actual radiant power, that is, the actual radiant power is consistent with original output power. In addition, self-impedance matching can also improve radiant power performance to an extent. For example, when the antenna array element spacing is from 0.3 to 0.5λ, the actual radiant power can still be 90% of the original output power. Moreover, when the transmit end matching network is accessed between the excitation source and the transmit end antenna array, a correlation of transmit signals can further be reduced, and a system capacity can further be improved.

Referring to FIG. 3, FIG. 3 is a schematic architectural diagram of a receive end according to the present invention.

As shown in FIG. 3, the receive end may include a receive antenna system 301 and a load 302, and the receive antenna system 301 may include a receive end antenna array 3011 and a receive end matching network 3012. A port for connecting the receive end matching network 3012 and the receive end antenna array 3011 is an input port of the receive end matching network 3012, that is, a port 1 shown in FIG. 3. A port for connecting the receive end matching network 3012 and the load 302 is an output port of the receive end matching network 3012, that is, a port 2 shown in FIG. 3.

The receive end antenna array 3011 is configured to convert an incident electromagnetic signal radiated by a spatial physical channel into a voltage signal or a current signal. The receive end matching network 3012 is configured to perform de-distortion on the voltage signal or the current signal according to an S parameter matrix of the receive end antenna array 3011, so as to configure energy that is coupled from an antenna array element to an adjacent antenna array element, thereby suppressing distortion of the voltage signal or the current signal, and reducing a coupling effect between antenna array elements. The load 302 is configured to receive the voltage signal or the current signal that has been de-distorted by the receive end matching network 3012.

Similar to a transmit end antenna array, the receive end antenna array 3011 may be a massive MIMO antenna array of a base station or a mobile terminal antenna array provided with a plurality of receive antennas. The receive end antenna array 3011 may include a plurality of antenna array elements, and the antenna array elements may use cross-polarization array element deployment, or may use co-polarization array element deployment.

In some embodiments, an array element spacing of the receive end antenna array is less than a half of a second wavelength. The second wavelength is a wavelength of a signal carrier received by the antenna system, and the array element spacing is an inter-row spacing or an inter-column spacing between antenna array elements included in the receive end antenna array.

For example, when the inter-column spacing between the antenna array elements is represented as $d_H$, the inter-row spacing between the antenna array elements is represented as $d_V$, and the wavelength of the signal carrier received by the antenna system is represented as $\lambda_2$, at least one of $d_H$ or $d_V$ may be less than a half of $\lambda_2$.

The load 302 is configured to obtain signal energy that has been received and processed, and the load 302 may be a specific communications device such as a radio frequency unit or a baseband processing unit. The receive end matching network 3012 may be a circuit network.

The receive end may be described by using an S parameter matrix. When the receive end is described by using the S parameter matrix, the S parameter matrix of the receive end antenna array 3011 may be represented as $\overline{S}_{RR}$, an S parameter matrix of the receive end matching network 3012 may be represented as $\overline{S}_M^{R_X}$, and an S parameter matrix of the load 302 may be represented as $\overline{S}_L$.

$\overline{S}_M^{R_X}$ may match $\overline{S}_{RR}$, so that the receive end matching network 3012 can perform de-distortion on a voltage signal or a current signal obtained after the receive end converts an electromagnetic signal. In this way, energy that is coupled from each antenna array element to an adjacent antenna array element is configured, so as to reduce a coupling effect between antenna array elements, and feed the signal that has been de-distorted to the load 302.

Because the receive end matching network 3012 can also control signal input and output, the receive end matching network 3012 may be represented by an S parameter matrix $$\overline{S}_M^{R_X} = \begin{pmatrix} \overline{S}_{11}^{R_X} & \overline{S}_{12}^{R_X} \\ \overline{S}_{21}^{R_X} & \overline{S}_{22}^{R_X} \end{pmatrix},$$

where $\overline{S}_{11}^{R_X}$ is a self-reflection coefficient matrix of the input port of the receive end matching network 3012, $\overline{S}_{22}^{R_X}$ is a self-reflection coefficient matrix of the output port of the receive end matching network 3012, $\overline{S}_{12}^{R_X}$ is a backward transmission matrix that is transmitted backward from the output port to the input port of the receive end matching network 3012, and $\overline{S}_{21}^{R_X}$ is a forward transmission matrix that is transmitted forward from the input port to the output port of the receive end matching network 3012.

There are also a plurality of specific manners of matching $\overline{S}_M^{R_X}$ and $\overline{S}_{RR}$. Generally, the receive end matching network 3012 may be a multiport conjugate matching network or a self-impedance matching network of the receive end antenna array 3011.

When the receive end matching network 3012 is the multiport conjugate matching network of the receive end antenna array 3011, the self-reflection coefficient matrix of the input port of the receive end matching network 3012 is $\overline{S}_{11}^{R_X} = \overline{S}_{RR}^H$, the self-reflection coefficient matrix of the output port of the receive end matching network 3012 is $\overline{S}_{22}^{R_X} = \overline{S}_{11}^{R_X} = \overline{S}_{RR}^H$, the forward transmission matrix of the receive end matching network 3012 is $\overline{S}_{21}^{R_X} = -\overline{U}_{22}\overline{\Theta}^H(\overline{I}-\overline{\Lambda}_{22})^{1/2}\overline{\nabla}_{11}^H$, and the backward transmission matrix of the receive end matching network 3012 is $\overline{S}_{12}^{R_X} = \overline{U}_{11}\overline{\Theta}(\overline{I}-\overline{\Lambda}_{22})^{1/2}\overline{\nabla}_{22}^H$, where $\overline{S}_{RR}$ is the S parameter matrix of the receive end antenna array 3011, $\overline{S}_{22}^{R_X} = \overline{U}_{22}\overline{\Lambda}_{22}^{1/2}\overline{\nabla}_{22}^H$ is singular value decomposition of $\overline{S}_{22}^{R_X}$, any unitary matrix $\overline{U}_{11} = \overline{U}_{22}$, $\overline{\nabla}_{11} = \overline{\nabla}_{22}$, or $\overline{\Theta}$ is any unit diagonal complex matrix.

When the receive end matching network 3012 is the self-impedance matching network of the receive end antenna array 3011, the self-reflection coefficient matrix of the input port of the receive end matching network 3012 is $\overline{S}_{11}^{R_X} = \text{diag}(\overline{S}_{RR}^H)$, the self-reflection coefficient matrix of the output port of the receive end matching network 3012 is $\overline{S}_{22}^{R_X} = \overline{S}_{11}^{R_X} = \text{diag}(\overline{S}_{RR}^H)$, the forward transmission matrix of the receive end matching network 3012 is $\overline{S}_{21}^{R_X} = -\overline{U}_{22}\overline{\Theta}^H(\overline{I}-\overline{\Lambda}_{22})^{1/2}\overline{\nabla}_{11}^H$, and the backward transmission matrix of the receive end matching network 3012 is $\overline{S}_{12}^{R_X} = \overline{U}_{11}\overline{\Theta}(\overline{I}-\overline{\Lambda}_{22})^{1/2}\overline{\nabla}_{22}^H$, where $\overline{S}_{RR}$ is the S parameter matrix of the receive end antenna array 3011, $\overline{S}_{22}^{R_X} = \overline{U}_{22}\overline{\Lambda}_{22}^{1/2}\overline{\nabla}_{22}^H$ is singular value decomposition of $\bar{S}_{22}^{R_X}$, any unitary matrix $\bar{U}_{11}=\bar{U}_{22}$, $\bar{V}_{11}=\bar{V}_{22}$, or $\bar{\Theta}$ is any unit diagonal complex matrix.

A basic principle of the receive end matching network 3012 is consistent with that of the transmit end matching network. Therefore, for a manner of determining $\bar{S}_{11}^{Rx}$, $\bar{S}_{22}^{Rx}$, $\bar{S}_{12}^{Rx}$, and $\bar{S}_{21}^{Rx}$, refer to a manner of determining $\bar{S}_{11}^{T_X}$, $\bar{S}_{22}^{T_X}$, $\bar{S}_{12}^{R_X}$, and $\bar{S}_{21}^{R_X}$. Details are not described herein again. After $\bar{S}_{11}^{Rx}$, $\bar{S}_{22}^{Rx}$, $\bar{S}_{12}^{Rx}$, and $\bar{S}_{21}^{Rx}$ are determined, a circuit structure conforming to a parameter value of each port may be designed according to a specific circuit design criterion, so as to obtain a circuit network that is used as the receive end matching network 3012. A specific circuit structure design method of the receive end matching network 3012 and a specific circuit structure of the receive end matching network 3012 are not described herein again.

It may be learned from experiments and simulations that, when an antenna array element spacing of a receive antenna is quite small (for example, the array element spacing is less than 0.5λ, where λ is a wavelength of a signal carrier received by the receive end), the receive end matching network can effectively reduce a correlation of receive signals, maximize receive power, and improve a system capacity. For example, when the receive end matching network is a self-impedance matching network and an antenna array element spacing is from 0.3 to 0.5λ, the receive signals can be basically de-correlated after the receive end matching network performs de-distortion on receive signals generated by the receive end antenna array.

Corresponding to an antenna in the present invention, a signal transmission method is further provided in the present invention.

Figure 4:
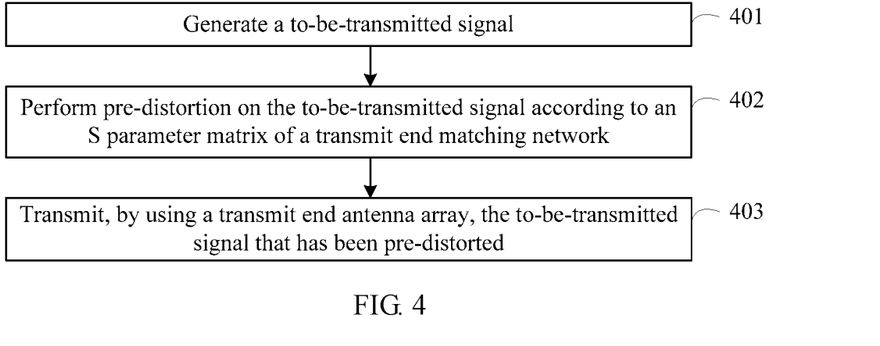
FIG. 4 is a schematic flowchart of an embodiment of a signal transmission method according to the present invention.

Referring to FIG. 4, FIG. 4 is a schematic flowchart of an embodiment of a signal transmission method according to the present invention.

Step 401: Generate a to-be-transmitted signal.

Step 402: Perform pre-distortion on the to-be-transmitted signal according to an S parameter matrix of a transmit end matching network, so as to configure energy that is coupled from each antenna array element to an adjacent antenna array element, thereby reducing a coupling effect between antenna array elements.

Pre-distortion performed on the to-be-transmitted signal according to an S parameter matrix of a transmit end matching network may be completed by using a transmit end matching network circuit. An S parameter matrix of the transmit end matching network circuit matches an S parameter matrix of a transmit end antenna array. For a specific manner of matching the transmit end matching network and the transmit end antenna array, refer to the foregoing embodiments. Details are not described herein again.

Step 403: Transmit, by using a transmit end antenna array, the to-be-transmitted signal that has been pre-distorted.

Figure 5:
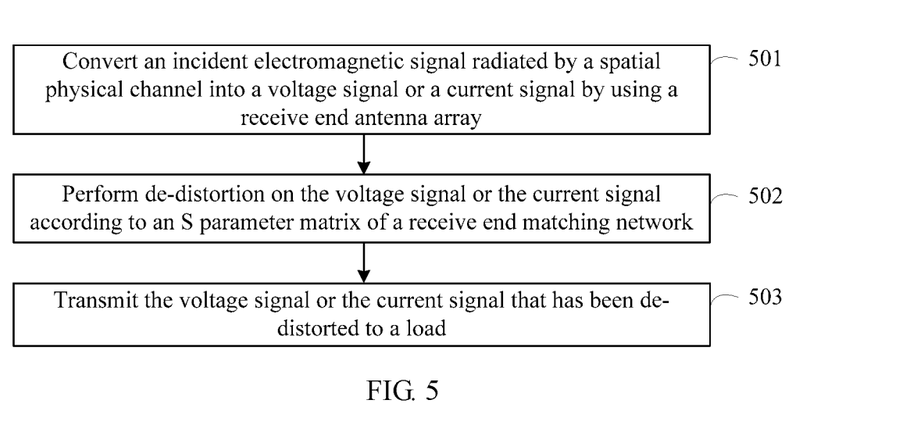
FIG. 5 is a schematic flowchart of another embodiment of a signal transmission method according to the present invention.

FIG. 5 is a schematic flowchart of another embodiment of a signal transmission method according to the present invention.

Step 501: Convert an incident electromagnetic signal radiated by a spatial physical channel into a voltage signal or a current signal by using a receive end antenna array.

Step 502: Perform de-distortion on the voltage signal or the current signal according to an S parameter matrix of a receive end matching network, so as to configure energy that is coupled from each antenna array element to an adjacent antenna array element, thereby reducing a coupling effect between antenna array elements.

De-distortion performed on the voltage signal or the current signal according to an S parameter matrix of a receive end matching network may be completed by using a receive end matching network circuit. An S parameter matrix of the receive end matching network circuit matches an S parameter matrix of the receive end antenna array. For a specific manner of matching between the receive end matching network and the receive end antenna array, refer to the foregoing embodiments. Details are not described herein again.

Step 503: Transmit the voltage signal or the current signal that has been de-distorted to a load.

In specific implementation, the present invention further provides a computer storage medium. The computer storage medium may store a program, and when the program is executed, some or all of the steps of each embodiment of the signal transmission method provided in the present invention may be included. The storage medium may be a magnetic disk, an optical disc, a read-only memory (ROM) or a random access memory (RAM), or the like.

According to the antenna and the signal transmission method provided in the present invention, pre-distortion is performed on a signal transmitted by the antenna array or de-distortion is performed on a signal received by the antenna array, so that energy that is coupled from each antenna array element to an adjacent antenna array element can be configured, thereby reducing a coupling effect between antenna array elements. The matching network is introduced into the antenna system, so that an antenna architecture design does not need to always consider a performance indicator limitation imposed when the antenna array elements are tightly coupled. The matching network is introduced, so that a massive MIMO antenna size can be reduced, and the antenna array elements can be more flexibly arranged under a requirement for a specific antenna size.

A person skilled in the art may clearly understand that, the technologies in the embodiments of the present invention may be implemented by software in addition to a necessary general hardware platform. Based on such an understanding, the technical solutions of the present invention essentially or the part contributing to the prior art may be implemented in a form of a software product. The software product is stored in a storage medium, such as a ROM/RAM, a hard disk, or an optical disc, and includes several instructions for instructing a computer device (which may be a personal computer, a server, or a network device) to perform the methods described in the embodiments or some parts of the embodiments of the present invention.

The embodiments described in this specification are all described in a progressive manner. For same or similar parts in the embodiments, reference may be made to these embodiments, and each embodiment focuses on a difference from other embodiments. Especially, some of the apparatus and system embodiments described herein are basically similar to a method embodiment, and therefore are described briefly. For related parts in those embodiments, refer to partial descriptions in the method embodiment.

The foregoing descriptions are implementation manners of the present invention, but are not intended to limit the protection scope of the present invention. Any modification, equivalent replacement, and improvement made without departing from the spirit and principle of the present invention shall fall within the protection scope of the present invention.

What is claimed is:

1. An antenna system, comprising a transmit end antenna array and a transmit end matching network, wherein
    an S parameter matrix of the transmit end matching network matches an S parameter matrix of the transmit end antenna array and the transmit end matching network is configured to perform pre-distortion on a to-be-transmitted signal according to the S parameter matrix of the transmit end matching network; and the transmit end antenna array is configured to transmit the to-be-transmitted signal that has been pre-distorted by the transmit end matching network; wherein the S parameter matrix of the transmit end matching network is $$\overline{\overline{S}}_M^{Tx} = \begin{pmatrix} \overline{\overline{S}}_{11}^{Tx} & \overline{\overline{S}}_{12}^{Tx} \\ \overline{\overline{S}}_{21}^{Tx} & \overline{\overline{S}}_{22}^{Tx} \end{pmatrix},$$

wherein $\overline{S}_{11}^{Tx}$ is a self-reflection coefficient matrix of an input port of the transmit end matching network;

$\overline{S}_{22}^{Tx}$ is a self-reflection coefficient matrix of an output port of the transmit end matching network;

$\overline{S}_{12}^{Tx}$ is a backward transmission matrix that is transmitted backward from the output port to the input port of the transmit end matching network; and $\overline{S}_{21}^{Tx}$ is a forward transmission matrix that is transmitted forward from the input port to the output port of the transmit end matching network.

2. The antenna system according to claim 1, wherein the transmit end matching network is a multiport conjugate matching network or a self-impedance matching network of the transmit end antenna array.

3. The antenna system according to claim 1, wherein when the transmit end matching network has a multiport conjugate matching structure of the transmit end antenna array, the self-reflection coefficient matrix of the output port of the transmit end matching network is $\overline{S}_{22}^{Tx} = \overline{S}_{TT}^{H}$;

the self-reflection coefficient matrix of the input port of the transmit end matching network is $\overline{S}_{11}^{Tx} = \overline{S}_{22}^{Tx} = \overline{S}_{TT}^{H}$;

the forward transmission matrix of the transmit end matching network is $\overline{S}_{21}^{Tx} = -\overline{U}_{22}\overline{\Theta}^H(\overline{I}-\overline{\Lambda}_{22})^{1/2}\overline{V}_{11}^H$; and the backward transmission matrix of the transmit end matching network is $\overline{S}_{12}^{Tx} = \overline{U}_{11}\overline{\Theta}(\overline{I}-\overline{\Lambda}_{22})^{1/2} \overline{V}_{22}^H$, wherein $\overline{S}_{TT}$ is the S parameter matrix of the transmit end antenna array, $\overline{S}_{22}^{Tx} = \overline{U}_{22}\overline{\Lambda}_{11}^{1/2}\overline{V}_{22}^H$ is singular value decomposition of $\overline{S}_{22}^{Tx}$, any unitary matrix $\overline{U}_{11} = \overline{U}_{22}$, $\overline{V}_{11}$ $\overline{V}_{22}$, or $\overline{\Theta}$ is any unit diagonal complex matrix.

4. The antenna system according to claim 1, wherein when the transmit end matching network has a self-impedance matching structure of the transmit end antenna array, the self-reflection coefficient matrix of the output port of the transmit end matching network is $\overline{S}_{22}^{Tx} = \text{diag}(\overline{S}_{TT}^{H})$;

the self-reflection coefficient matrix of the input port of the transmit end matching network is $\overline{S}_{11}^{Tx} = \overline{S}_{22}^{Tx} = \text{diag} \overline{S}_{TT}^{H}$;

the forward transmission matrix of the transmit end matching network is $\overline{S}_{21}^{Tx} = -\overline{U}_{22}\overline{\Theta}^H(\overline{I}-\overline{\Lambda}_{22})^{1/2} \overline{V}_{11}^H$; and the backward transmission matrix of the transmit end matching network is $\overline{S}_{12}^{Tx} = \overline{U}_{11}\overline{\Theta}(\overline{I}-\overline{\Lambda}_{22})^{1/2} \overline{V}_{22}^H$, wherein $\overline{S}_{TT}$ is the S parameter matrix of the transmit end antenna array, diag(•) an operation of taking diagonal elements of a matrix to form a diagonal matrix, $\overline{S}_{22}^{Tx} = \overline{U}_{22}\overline{\Lambda}_{22}^{1/2} \overline{V}_{22}^H$ is singular value decomposition of $\overline{S}_{22}^{Tx}$, any unitary matrix $\overline{U}_{11} = \overline{U}_{22}$, $\overline{V}_{11}$ $\overline{V}_{22}$, or $\overline{\Theta}$ is any unit diagonal complex matrix.

5. The antenna system according to claim 1, wherein an array element spacing of the transmit end antenna array is less than a half of a first wavelength, wherein the array element spacing is an inter-row spacing or an inter-column spacing between antenna array elements comprised in the transmit end antenna array, and the first wavelength is a wavelength of a signal carrier connected to the antenna system.

6. A signal transmission method for an antenna system, wherein the antenna system comprises a transmit end antenna array and a transmit end matching network, comprising:

performing pre-distortion on a to-be-transmitted signal according to an S parameter matrix of a transmit end matching network, wherein the S parameter matrix of the transmit end matching network matches an S parameter matrix of a transmit end antenna array; and transmitting, by using the transmit end antenna array, the to-be-transmitted signal that has been pre-distorted; wherein the S parameter matrix of the transmit end matching network is $$\overline{\overline{S}}_M^{Tx} = \begin{pmatrix} \overline{\overline{S}}_{11}^{Tx} & \overline{\overline{S}}_{12}^{Tx} \\ \overline{\overline{S}}_{21}^{Tx} & \overline{\overline{S}}_{22}^{Tx} \end{pmatrix},$$

wherein $\overline{S}_{11}^{Tx}$ is a self-reflection coefficient matrix of an input port of the transmit end matching network;

$\overline{S}_{22}^{Tx}$ is a self-reflection coefficient matrix of an output port of the transmit end matching network;

$\overline{S}_{12}^{Tx}$ is a backward transmission matrix that is transmitted backward from the output port to the input port of the transmit end matching network; and $\overline{S}_{21}^{Tx}$ is a forward transmission matrix that is transmitted forward from the input port to the output port of the transmit end matching network.

7. The method according to claim 6, wherein the transmit end matching network is a multiport conjugate matching network or a self-impedance matching network of the transmit end antenna array.

8. The method according to claim 6, wherein when the transmit end matching network has a multiport conjugate matching structure of the transmit end antenna array, the self-reflection coefficient matrix of the output port of the transmit end matching network is $\overline{S}_{22}^{Tx} = \overline{S}_{TT}^{H}$;

the self-reflection coefficient matrix of the input port of the transmit end matching network is $\overline{S}_{11}^{Tx} = \overline{S}_{22}^{Tx} = \overline{S}_{TT}^{H}$;

the forward transmission matrix of the transmit end matching network is $\overline{S}_{21}^{Tx} = -\overline{U}_{22}\overline{\Theta}^H(\overline{I}-\overline{\Lambda}_{22})^{1/2} \overline{V}_{11}^H$; and the backward transmission matrix of the transmit end matching network is $\overline{S}_{12}^{Tx} = \overline{U}_{11}\overline{\Theta}(\overline{I}-\overline{\Lambda}_{22})^{1/2} \overline{V}_{22}^H$, wherein $\overline{S}_{TT}$ is the S parameter matrix of the transmit end antenna array, $\overline{S}_{22}^{Tx} = \overline{U}_{22}\overline{\Lambda}_{22}^{1/2}\overline{V}_{22}^H$ is singular value decomposition of $\overline{S}_{22}^{Tx}$, any unitary matrix $\overline{U}_{11} = \overline{U}_{22}$, $\overline{V}_{11}$ $\overline{V}_{22}$, or $\overline{\Theta}$ is any unit diagonal complex matrix.

9. The method according to claim 6, wherein when the transmit end matching network has a self-impedance matching structure of the transmit end antenna array, the self-reflection coefficient matrix of the output port of the transmit end matching network is $\bar{S}_{22}^{Tx} = \text{diag}(\bar{S}_{TT}^H)$;

the self-reflection coefficient matrix of the input port of the transmit end matching network is $\bar{S}_{11}^{Tx} = \bar{S}_{22}^{Tx} = \text{diag}(\bar{S}_{TT}^H)$;

the forward transmission matrix of the transmit end matching network is $\bar{S}_{21}^{Tx} = -\bar{U}_{22} \bar{\Theta}^H (\bar{I} - \bar{\Lambda}_{22})^{1/2} \bar{\nabla}_{11}^H$; and the backward transmission matrix of the transmit end matching network is $\bar{S}_{12}^{Tx} = \bar{U}_{11} \bar{\Theta} (\bar{I} - \bar{\Lambda}_{22})^{1/2} \bar{\nabla}_{22}^H$, wherein $\bar{S}_{TT}$ is the S parameter matrix of the transmit end antenna array, diag(•) is an operation of taking diagonal elements of a matrix to form a diagonal matrix, $\bar{S}_{22}^{Tx} = \bar{U}_{22} \bar{\Lambda}_{22}^{1/2} \bar{\nabla}_{22}^H$ is singular value decomposition of $\bar{S}_{22}^{Tx}$, any unitary matrix $\bar{U}_{11} = \bar{U}_{22}$, $\bar{\nabla}_{11} = \bar{\nabla}_{22}$, or $\bar{\Theta}$ is any unit diagonal complex matrix.

10. The method according to claim 6, wherein an array element spacing of the transmit end antenna array is less than a half of a first wavelength, wherein the array element spacing is an inter-row spacing or an inter-column spacing between antenna array elements comprised in the transmit end antenna array, and the first wavelength is a wavelength of a signal carrier connected to the antenna system.

\* \* \* \* \*